United States Patent
Stautner et al.

(10) Patent No.: US 9,234,541 B2
(45) Date of Patent: Jan. 12, 2016

(54) SUSPENSION STRUT BEARING

(71) Applicant: Schaeffler Technologies GmbH & Co. KG, Herzogernaurach (DE)

(72) Inventors: Ralf Stautner, Nuremberg (DE); Andreas Wollner, Nuremberg (DE); Rainer Lutz, Markt Erlbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/376,226

(22) PCT Filed: Jan. 21, 2013

(86) PCT No.: PCT/EP2013/051036
§ 371 (c)(1),
(2) Date: Aug. 1, 2014

(87) PCT Pub. No.: WO2013/120658
PCT Pub. Date: Aug. 22, 2013

(65) Prior Publication Data
US 2015/0030278 A1    Jan. 29, 2015

(30) Foreign Application Priority Data
Feb. 14, 2012 (DE) .......................... 10 2012 202 157

(51) Int. Cl.
*F16C 33/76* (2006.01)
*F16C 19/12* (2006.01)
*B60G 15/06* (2006.01)
*F16C 33/78* (2006.01)
*F16C 35/04* (2006.01)
*F16C 19/10* (2006.01)

(52) U.S. Cl.
CPC .............. *F16C 19/12* (2013.01); *B60G 15/068* (2013.01); *F16C 33/76* (2013.01); *F16C 33/761* (2013.01); *F16C 33/783* (2013.01); *F16C 33/7843* (2013.01); *F16C 33/7886* (2013.01); *F16C 35/045* (2013.01); *B60G 2204/128* (2013.01); *B60G 2204/418* (2013.01); *F16C 19/10* (2013.01); *F16C 2326/05* (2013.01)

(58) Field of Classification Search
CPC ........ F16C 19/10; F16C 19/12; F16C 19/163; F16C 33/76; F16C 33/761; F16C 33/78; F16C 33/7806; F16C 33/783; F16C 33/784; F16C 33/7843; F16C 33/7886; F16C 2326/05; B60G 15/068; B60G 2204/128; B60G 2204/418
See application file for complete search history.

(56) References Cited

U.S. PATENT DOCUMENTS

2012/0213464 A1* 8/2012 Stautner et al. ................ 384/607
2012/0321238 A1* 12/2012 Corbett et al. ................. 384/590

FOREIGN PATENT DOCUMENTS

DE    102006057559    6/2008
EP    1000781         5/2000
(Continued)

*Primary Examiner* — James Pilkington
(74) *Attorney, Agent, or Firm* — Volpe and Koenig, P.C.

(57) ABSTRACT

A suspension strut bearing (1) having two assemblies (11, 12), which are counter-rotatable about a longitudinal axis (z) and centered with respect to each other, including two bearing rings (2, 3), which are each allocated to one assembly (11, 12) and counter-rotatable when mounted, and a sealing device (8). In order to decouple the sealing device (8) and the centering from each other with respect to the function thereof and still provide said parts cost-effectively, a single-piece, two-component element (5) is provided on one of the bearing rings (2), which element centers the assemblies (11, 12) one over the other by a first component having a greater stiffness than a second component and forms the sealing device (8) with the second component.

10 Claims, 2 Drawing Sheets

(56) References Cited

FOREIGN PATENT DOCUMENTS

| EP | 1170157 | 1/2002 |
| EP | 1555144 | 7/2005 |
| FR | 2901737 | 12/2007 |
| GB | 2145781 | 4/1985 |
| WO | WO2008/068179 | * 6/2008 |

* cited by examiner

SUSPENSION STRUT BEARING

FIELD OF THE INVENTION

The invention concerns a suspension strut bearing comprising two assemblies which are counter-rotatable about a longitudinal axis and centered with respect to each other, said assemblies comprising two bearing rings each of which is associated to one of said assemblies which are counter-rotatable when mounted, and further comprising a sealing device acting between said components.

BACKGROUND

Suspension struts are known from the field of chassis construction. In this field, one assembly is firmly connected to the body of an automotive vehicle and the other assembly is connected to a wheel. In the longitudinal direction of their longitudinal axis, the assemblies are provided with a damping device, for example a combination of compression spring and shock absorber which compensate roadway unevenness. In order to guarantee a counter-rotation of the assemblies, for instance for steering a wheel, DE 10 2006 057 559 A1 proposes for example a suspension strut bearing in the form of a rolling bearing comprising two bearing rings with inter-disposed rolling elements and carrier elements and also a sealing device, all of which together form an assembly, one carrier element being associated to each of the bearing rings. Around the upper carrier element is arranged a further, plastic element which forms the sealing device and seals relative to the lower carrier element. The sealing device is clamped between the receiver on the suspension strut and the carrier element, which means that, under load, the softer material of the sealing device can get deformed and the sealing action can be deteriorated. Furthermore, a centering of the two assemblies with respect to each other, which are counter-rotatable through the suspension strut bearing, is rendered more difficult.

SUMMARY

It is an object of the invention to provide an advantageous further development of a suspension strut bearing comprising a sealing device, and to provide a centering of the suspension strut bearing.

The invention achieves the above object with a suspension strut bearing comprising two assemblies which are counter-rotatable about a longitudinal axis and centered with respect to each other, said assemblies comprising two bearing rings each of which is allocated to one of said assemblies which are counter-rotatable when mounted, and further comprising a sealing device acting between said components, wherein a single-piece, two-component element is provided on one of the bearing rings, which two-component element centers the assemblies with respect to each other through a first component possessing a higher rigidity than a second component, and forms the sealing device through the second component. With help of the two-component element, the assemblies of the suspension strut bearing can be simplified and improved. The harder component takes over the centering of the bearing with the two bearing rings and thus also the centering of the two assemblies of the suspension strut with respect to each other, whereas the softer component forms the sealing device. The bearing rings can be slidingly arranged on each other and form a sliding bearing. Preferably, however, the suspension strut bearing is configured as a single-row or multi-row rolling bearing such as a deep groove ball bearing, an angular contact ball bearing or the like, so that, in addition to the radial guidance, an axial guidance of the assemblies on the suspension strut is also enabled.

The two-component element can be made for instance through a two-component injection molding method in which the two components are connected to each other by fusion of materials. In this case, in order to improve force transmission between the two components, an additional positive engagement can be provided. For this purpose, one of the components can comprise extensions, arms or the like that engage into complementary recesses in the other component. In this connection, it has proved to be particularly advantageous if, in a first manufacturing step, the hard component is made with appropriate recesses by the injection molding method followed by injection of the second component, so that appropriate arms or extensions can flow into the recesses and subsequently harden so that said positive engagement is realized. In addition, it has also proved to be advantageous if the second component is reinforced with a sheet metal part. Such a sheet metal part can be injected into the hard component preferably already during injection molding and can be fixed there later. The sheet metal part can comprise appropriate recesses into which the hard component penetrates. Preferably, the metal element serves as a support surface for one of the assemblies of the suspension strut and is preferably arranged on a front end of the two-component element opposite the sealing device.

The two-component element takes over the centering of the suspension strut bearing and of the assemblies of the suspension strut in that, advantageously, the two-component element is configured with a ring-shape with an outer centering surface and a side wall placed against the bearing ring. The sealing device is arranged preferably radially between the side wall and the outer periphery and is made bush-shaped with an end sealing lip. In this way, a reception for the sealing device is realized independently of a positioning and centering of the suspension strut bearing relative to the assemblies of the suspension strut, so that through its sealing lip, the sealing device can seal relative to a counter-sealing surface without being influenced by positioning and centering.

In an advantageous exemplary embodiment, a bearing ring configured as an outer ring is received on a rim of a first assembly, preferably on the part that forms the tubular part of the suspension strut or on a part connected to the tubular part. The second assembly, preferably, the head part of the suspension strut, is centered through the two-component element relative to the first assembly in that the bearing ring configured as an inner ring is received on the side wall of the two-component element and the head part is received on the outer periphery of the two-component element and is centered through an inner peripheral surface. For this purpose, the two-component element preferably engages around an inner periphery of the bearing ring that is configured as an inner ring, so that the bearing rings and, if necessary, also the rolling elements that roll on the bearing rings are substantially completely encapsulated. A part of the two-component element engaging around the bearing rings radially on the inside can be formed out of the soft, less rigid component and can comprise a sealing lip or sealing edge that bears against a component of the suspension strut to thus form a dynamic seal. Radially on the outside, sealing is realized preferably between the two assemblies of the suspension strut. For this purpose, the sealing device can be provided with a sealing lip, if necessary a biased sealing lip, for bearing against a respective sealing surface of each assembly. It has proved to be particularly advantageous if the sealing surfaces of the two assemblies overlap in axial direction and radial sealing is realized between the sealing surfaces through the sealing device.

BRIEF DESCRIPTION OF THE DRAWINGS

The invention will now be described more closely with reference to the examples of embodiment illustrated in FIGS. 1 to 5.

DETAILED DESCRIPTION OF THE PREFERRED EMBODIMENTS

Figure 1:
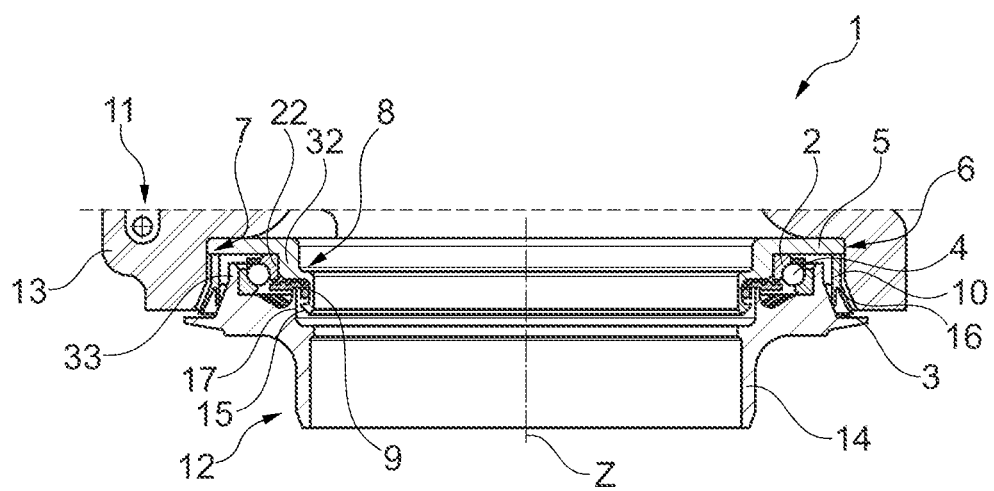
FIG. 1 shows a partial sectional view of a suspension strut bearing.

FIG. 1 shows the suspension strut bearing 1 comprising the assemblies 11, 12 that are rotatable about the longitudinal axis z. Assembly 11 can be received through the inner side, such as the inner diameter, or the outer side, such as the outer diameter in a dome of a suspension strut. Assembly 12 is preferably arranged in the tubular part of the suspension strut. The suspension strut bearing 1 forms a further assembly comprising the two bearing rings 2, 3 and the rolling elements 4 that roll on these bearing rings.

Further, the ring-shaped two-component element 5 is preferably received on the inner ring 2 allocated to the assembly 11 that is to be connected to the dome of the suspension strut, centering being realized through the side wall 32 that forms the centering surface 22. The bearing ring 3 is received centered on the rim 33 of the tubular part 14. With its outer periphery 6, the two-component element 5 centers the head part 13 of the assembly 11 through the centering surface 7 of the head part 13. Further, the sealing device 8 which encapsulates the bearing rings 2, 3 as also the rolling elements on the outside is arranged on the two-component element 5. For this purpose, the two-component element 5 comprises axially extending, substantially bush-shaped extensions 9, 10 that comprise sealing contacts 15, 16 radially on the outside and radially on the inside of the bearing rings 2, 3. Radially on the inside, the sealing contact 15 seals under pre-stress on the sealing surface 17 of the tubular part 14. Radially on the outside, the head part 13 and the tubular part 14 of the assembly 12 overlap axially along the longitudinal axis z. The sealing contact 16 of the extension 10 configured as a sealing lip seals the gap between the head part 13 and the tubular part 14 thus forming a radial seal.

Figure 2:
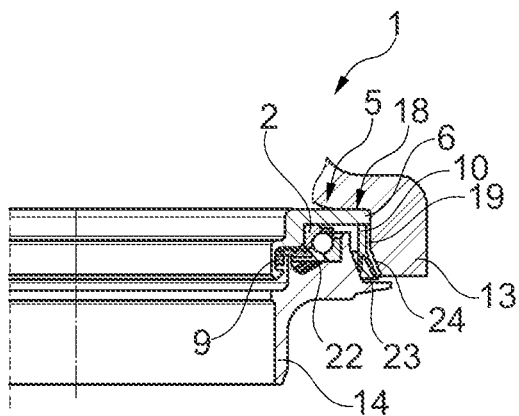
FIGS. 2 and 3 show different sectional views of the suspension strut bearing of FIG. 1.
Figure 3:
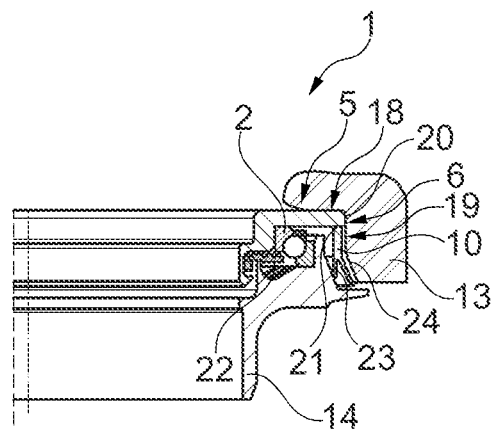
Figure 4:
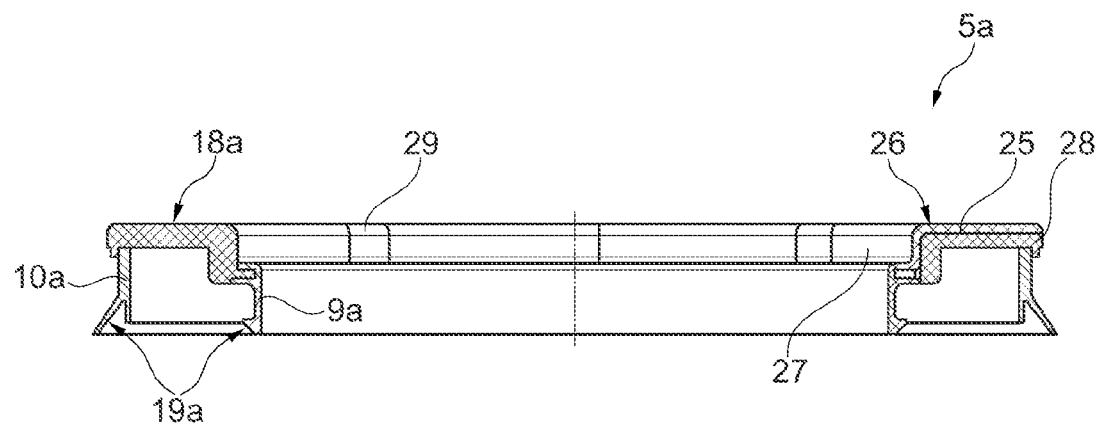
FIG. 4 shows a section through a two-component element comprising a reinforcement.
Figure 5:
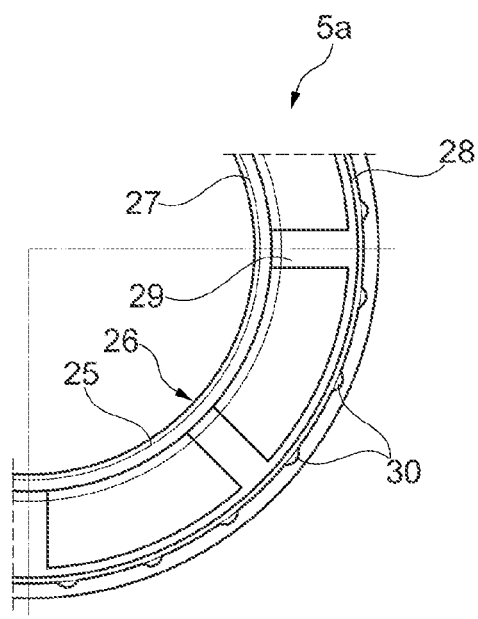
FIG. 5 shows a partial view of the two-component element of FIG. 4.

As disclosed in the partial sections of the suspension strut bearing 1 shown in FIGS. 2 and 3, the two-component element 5 is made up of different components 18, 19. The component 18 is made of rigid, for instance reinforced plastic, whereas the extension 10 formed out of the component 19 is less rigid and made for instance out of a sealing material like EPDM, NBR or the like. The extension 9 can be made out of the component 18 or out of the component 19. The two-component element 5 is made preferably by a two-component injection molding method in that, one component, preferably component 18, is injected at first, and the second component, preferably component 19, is subsequently injected and forms a connection by fusion of materials. As can be seen in viewing FIGS. 2 and 3 together, in order to avoid breakaways, recesses 20 spaced apart over the periphery are provided in the component 18, and axially extending arms 21 of the extension 10 are injected into these recesses so that a connection by positive engagement is formed between the components 18 and 19. The rigid component 18 constitutes the centering between the bearing ring 2 and the head part 13 while, radially between the centering surface 22 and the outer periphery 6, decoupled from the arising force path, the extension 10 is formed out of the less rigid component 19 so that a permanent and uninterrupted sealing contact can result, on the one hand between the sealing lips 23, 24 and the head part 13, and on the other hand between the sealing lips 23, 24 and the tubular part 14.

As a modification of the two-component element 5 of FIGS. 1 to 3, FIGS. 4 and 5 show in a sectional view and in a partial sectional view, respectively, the two-component element 5a with the reinforcement 26 formed out of the sheet metal part 25. The reinforcement 26 endows the two-component element 5a with additional stability and wear resistance, particularly at its contact surfaces with the components of the assembly 11 such as the head part 13 (FIG. 1). For this purpose, the sheet metal part 25 engages around the component 18a radially on the outside and radially on the inside with collars 27, 28. The collars 27, 28 are connected to each other by webs 29 arranged spaced apart on the periphery. Component 18a comprises on the outer periphery radially protruding centering knobs 30 arranged spaced apart on the outer periphery, which centering knobs 30 constitute the centering relative to the head part 13 (FIG. 1). Alternatively, comparable knobs may be provided on the sheet metal part 25. The sheet metal part 25 is preferably made by injection into the component 18a during the manufacture of the two-component element 5a by injection molding. In the example shown, both the extensions 9a, 10a are made out of the soft component 19a and connected by positive engagement to the component 18a.

LIST OF REFERENCE NUMERALS

1 Suspension strut bearing
2 Bearing ring
3 Bearing ring
4 Rolling element
5 Two-component element
5a Two-component element
6 Outer periphery
7 Centering surface
8 Sealing device
9 Extension
9a Extension
10 Extension
10a Extension
11 Assembly
12 Assembly
13 Head part
14 Tubular part
15 Sealing contact
16 Sealing contact
17 Sealing surface
18 Component
18a Component
19 Component
19a Component
20 Recess
21 Arm
22 Centering surface
23 Sealing lip
24 Sealing lip
25 Sheet metal part
26 Reinforcement 27 Collar
28 Collar
29 Web
30 Centering knob
30 Side wall
33 Rim
z Longitudinal axis

The invention claimed is:

1. A suspension strut bearing comprising a first assembly including a tubular part and a second assembly including a head part, and the first and second assemblies are counter-rotatable about a longitudinal axis (z) and centered with respect to each other, each of said first and second assemblies comprising a bearing ring which is allocated to one of said assemblies which are counter-rotatable when mounted, and a two-component element provided on one of the bearing rings, said two-component element centers the two assemblies with respect to each other through a first of the components possessing a higher rigidity than a second of the components, and the second component forms a sealing device, wherein the two-component element includes an axially extending, substantially bush-shaped extension, and the sealing device includes a sealing lip that seals a gap between the head part and the tubular part, wherein the sealing lip includes two sealing lips, one of the two sealing lips contacts the head part and the other one of the two sealing lips contacts the tubular part.

2. A suspension strut bearing of claim 1, wherein the two components are connected to each other through positive engagement.

3. A suspension strut bearing of claim 1, wherein the two-component element is made by an injection molding method.

4. A suspension strut bearing of claim 1, wherein the two-component element is made ring-shaped with an outer centering surface configured on an outer periphery and a centering surface configured on a side wall, said centering surface bears against the bearing ring that is configured as an inner ring.

5. A suspension strut bearing of claim 4, wherein the sealing device is bush-shaped, and the sealing lip is arranged radially between the centering surface and the outer periphery.

6. A suspension strut bearing of claim 1, wherein (1) an outer ring is received on a rim of the first assembly, and (2) the two-component element is received on an inner periphery of an inner ring.

7. A suspension strut bearing of claim 1, wherein the two-component element engages around an inner periphery of the bearing ring that is configured as an inner ring.

8. A suspension strut bearing of claim 1, wherein the two-component element is at least partially reinforced with a sheet metal part.

9. A suspension strut bearing of claim 8, wherein the sheet metal part is connected by injection molding on a front end of the two-component element that is turned away from the sealing device.

10. A suspension strut bearing of claim 1, wherein the two-component element is arranged with the assembly that is connected to a dome of a suspension strut.

* * * * *